United States Patent [19]

Levine et al.

[11] Patent Number: 5,276,911
[45] Date of Patent: Jan. 4, 1994

[54] CONTENTION REDUCING TECHNIQUE FOR A RADIO FREQUENCY COMMUNICATION SYSTEM

[75] Inventors: Stephen N. Levine, Itasca; Douglas C. Dominiak, Chicago; Mary B. Flanders, Wood Dale, all of Ill.

[73] Assignee: Motorola, Inc., Schaumburg, Ill.

[21] Appl. No.: 608,414

[22] Filed: Nov. 2, 1990

[51] Int. Cl.$^5$ .............................................. H04B 7/26
[52] U.S. Cl. .................................. 455/53.1; 455/33.1; 455/54.1; 455/67.1
[58] Field of Search .................. 455/33, 34, 53, 54, 455/56, 67, 33.1, 33.2, 33.4, 34.1, 34.2, 53.1, 54.1, 54.2, 56.1, 67.1; 379/59, 60, 63

[56] References Cited

U.S. PATENT DOCUMENTS 4,887,265 12/1989 Felix ...................................... 370/94.1
4,905,302 2/1990 Childress et al. ...................... 455/34

Primary Examiner—Reinhard J. Eisenzopf
Assistant Examiner—Chi Pham
Attorney, Agent, or Firm—Val Jean F. Hillman

[57] ABSTRACT

In a cellular radiotelephone communication system, there is provided a method and apparatus for reducing contention between a plurality of mobile units requesting system resources comprising the steps of A) receiving access requests from at least one of the plurality of mobile units, B) determining the number of attempted access requests (access request count); and C) altering system resources as a function of the access request count in order to reduce the likelihood of contending mobile units. An alternative embodiment suggests deriving timing advance information as well as access request count, correlating the access request count to the timing advance information, and altering system resources as a function of the correlation in order to reduce the likelihood of contention. Yet another embodiment suggests that the mobile unit take independent action, based upon its access request count, in order to reduce the likelihood of contention.

12 Claims, 4 Drawing Sheets

CONTENTION REDUCING TECHNIQUE FOR A RADIO FREQUENCY COMMUNICATION SYSTEM

FIELD OF THE INVENTION

The present invention relates generally to communication systems. More particularly this invention relates to communication system access procedures. Specifically, however, this invention relates to a method for reducing levels of contention within a cellular radiotelephone communication system servicing a plurality of mobile units that request system resources.

BACKGROUND OF THE INVENTION

Cellular radiotelephone service has been in use for some time and has traditionally been characterized by a central site transmitting with high power to a limited number of mobile units in a large geographic area of radiotelephone service, hereinafter referred to as a cell. Mobile transmissions, due to their lower power, are received by a network of receivers located remotely from the central site and then returned to the central site for processing. Digital cellular radiotelephone service may be similarly characterized. One major difference, however, is the use of digital voice and data channels which permit the efficient allocation of system resources via any of the well known multiple access schemes, such as, for example, Time Division Multiple Access (TDMA).

In a digital cellular radiotelephone communication system, each cell dedicates one or more communication channels as a Common Control Channel (CCCH). The CCCH is made up of several logical channels which provide different services to the mobile subscriber. The Random Access Channel (RACH) is used for receiving access requests from mobile subscriber units. The Access Grant Channel (AGCH) is used to instruct mobile subscriber units, via channel designation messages, to tune to a particular frequency and time slot where signalling may take place. The ECHO channel will identify the mobile that accessed on the previous uplink slot, will indicate that the previous slot was idle, or will indicate the occurrence of a collision. The Broadcast Control Channel (BCCH) is used to transmit cell specific parameters to the mobile subscribers tuned to the cell.

In digital cellular radiotelephone systems, there are several access procedures a requesting mobile unit can initiate when attempting to obtain and utilize system resources. These access procedures inform the system which type of operation a requesting mobile unit is attempting to perform. Such operations include but are not limited to, call origination, location reporting, registration and page response.

The typical access procedure may be summarized as follows. A mobile unit sends its system access request over the RACH, starts an access timer, and awaits a channel designation message from the Base Station System (BSS), which informs the mobile whether the access was successful. If the BSS fails to respond to the mobile unit before the access timer expires, the mobile will reissue its request. This procedure will continue until the mobile unit receives a valid confirmation, or until a maximum number of retries have been attempted, as defined by the BSS.

For identification purposes, each mobile unit's access request contains mobile identification information. Therefore, each BSS receives mobile specific information with which to distinguish one mobile unit's access request from that of another. Access requests, however, do not contain information pertaining to the number of previous requests. Whenever a mobile unit retransmits its access request there is no means for the BSS to determine whether the received request is the mobile's first or a subsequent attempt. It would be extremely advantageous therefore to provide a method for informing the BSS of the number of requests attempted by each mobile unit accessing the system, thereby providing the BSS with information vital for monitoring system performance and reducing levels of contention between two or more mobiles requesting the same resources at the same time.

SUMMARY OF THE INVENTION

Briefly described, the present invention is a method and apparatus for reducing contention between a plurality of mobile units, requesting system resources, and a communication system servicing those mobile units. The communication system is designed for receiving access requests from the plurality of mobile units, and determining an access request count for each received access request. Thereafter, the communication system is responsible for altering system resources as a function of the access request count in order to reduce the likelihood of contending mobile units.

In another embodiment, it is suggested that the communication system will correlate the timing advance information derived for each mobile unit to the mobile's access request count, and alter system resources as a function of the correlation.

In yet another embodiment it is suggested that the mobile unit will take independent action to reduce the likelihood of contention, based upon its access request count.

DESCRIPTION OF A PREFERRED EMBODIMENT

Figure 1:
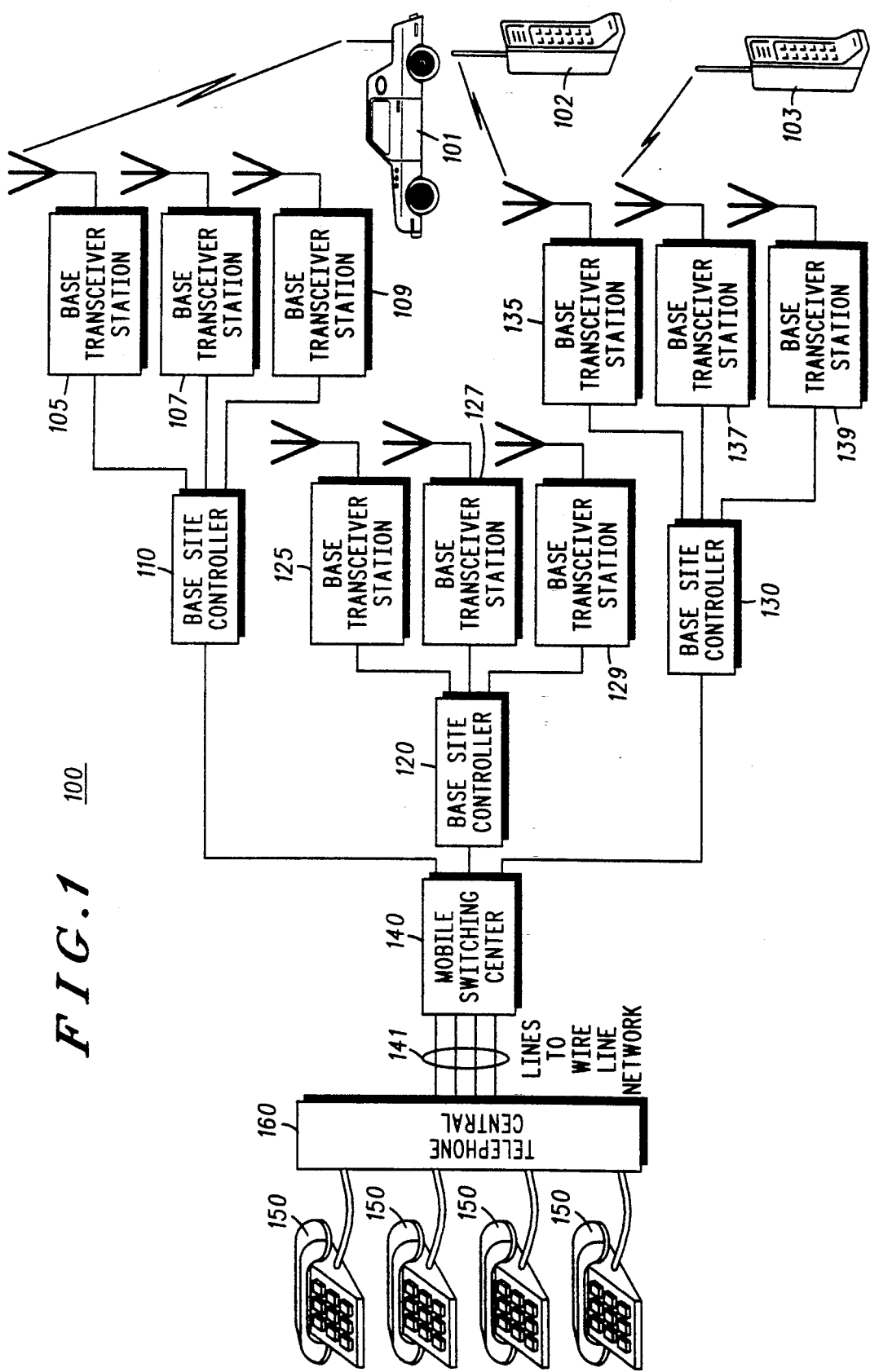
FIG. 1 is partial block diagram of a communication system according to the present invention.

A principle application of the present invention is for a digital cellular radiotelephone communication system. Referring to FIG. 1, there is shown a partial block diagram of a communication system 100 showing the interconnection between the Base Transceiver Stations (BTS) and the mobile units which communicate with the system. Three Base Site Controllers (BSC) 110, 120 and 130 are shown. Each BSC controls one or more BTSs. For example, BSC 110 is shown connected to BTS units 105, 107 and 109. Collectively, a BSC and its accompanying BTSs may be referred to as a Base Station System (BSS). Each BSS is responsible for sending and receiving communication signals to and from various mobile units. For the purpose of simplicity, only three BSSs are shown, each consisting of a single BSC with three BTSs. It will be appreciated by those skilled in the art, however, that any number of BSSs may be used depending upon the size of the area to be covered.

Each of the BSCs 110, 120 and 130 is further connected to the Mobile Switching Center (MSC) 140 which is also connected to a standard wire line telephone network via lines 141. The lines 141 provide a connection to a plurality of fixed telephones 150 via a telephone central 160. Three mobile units 101, 102 and 103, each containing a transmitter and a receiver for communicating with the BSSs are shown. While only three mobile units are depicted, it will be appreciated by those skilled in the art that the actual number of mobile units serviceable by the communication system 100 is limited only by the number of BSSs, the number of frequencies allocated to the system, and the number of lines allocated to connections with the wire line network.

In operation, incoming messages, like access requests, are transmitted by a mobile unit, for example, mobile unit 101. When received by a BSS, the request is processed and a decision is made whether or not to allocate system resources such as a communication channel. Assuming adequate resources are available, the BSS then returns a channel designation message to the mobile unit informing the mobile unit what frequency and time slot to tune to in order to find an available communication channel. Thereafter, the access request is further processed in order to complete the requested operation. During a call origination procedure, for example, the MSC 140 is directed to connect BSC 110 to either the wire line telephone network or to another BSC, such as BSC 130, depending upon whether communication with a fixed or mobile telephone is desired.

Figure 4:
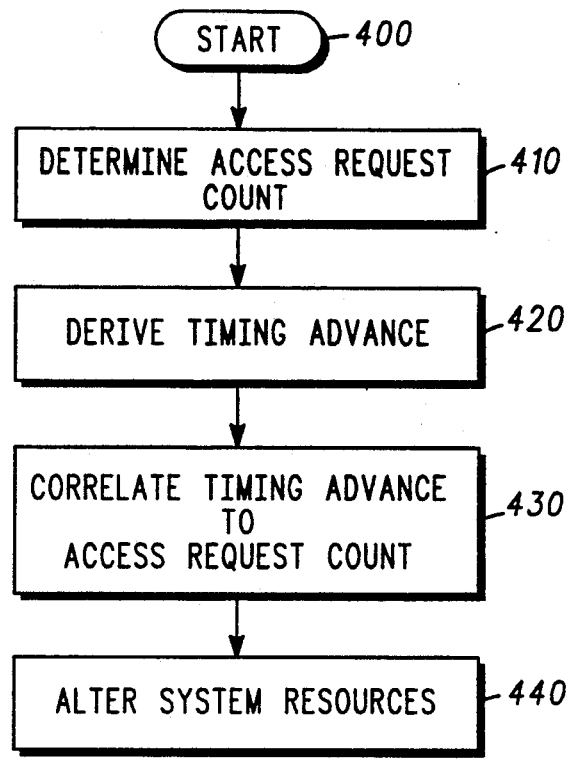
FIG. 4 is a flow chart diagram of alternative steps performed by a BSS in order to reduce the likelihood of contention according to the present invention.
Figure 5:
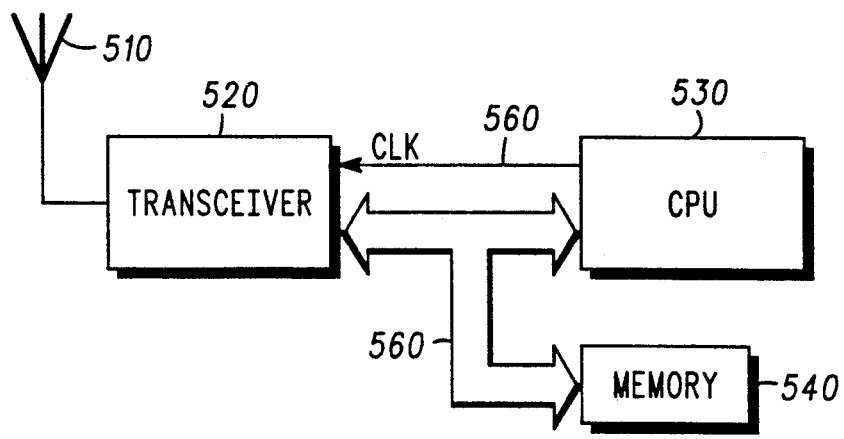
FIG. 5 depicts a partial block diagram of a BSS of FIG. 1, suited for performing contention reduction in accordance with the present invention.

FIG. 5 depicts a partial block diagram of a BSS as described with reference to FIG. 1 and suited for performing the steps described below in FIGS. 2, 3 and 4. While FIG. 5 depicts only a partial block diagram, it will nonetheless be appreciated by those skilled in the art that other components are typically included in such a device. For the purpose of this discussion, however, only those components pertinent to the present invention are shown and described. In accordance therewith, the BSS of FIG. 5 comprises a transceiver 520, a central processing unit (CPU) 530 and memory 540 which are all connected via a data bus 550.

During operation, the transceiver 520 receives communication signals from a requesting mobile unit via antenna 510. As will be appreciated by those skilled in the art, the received RF signals are demodulated by the transceiver 520 into a data bit stream which is passed over the data bus 550 to the memory device 540 under the operation and control of the (CPU) 530 and clock 560. The CPU 530, as is known, operates under the direction and control of an operating system stored within memory 540, which may comprise the necessary random access memory (RAM) and read only memory (ROM) required to support system operation. The transceiver 520 is of a type well known in the art and thus requires no additional discussion. The same is true of the bidirectional data bus 550 and the memory device 540 which may be included within the CPU 530. In accordance with the preferred embodiment, the CPU 530 may be any of the CPU's devices well known in the art, such as the Motorola 68HC11, available in the past from Motorola Inc. by contacting the Motorola Semiconductor Products Sector 5005 E. McDowell Road Phoenix, Ariz. 85008.

Figure 2:
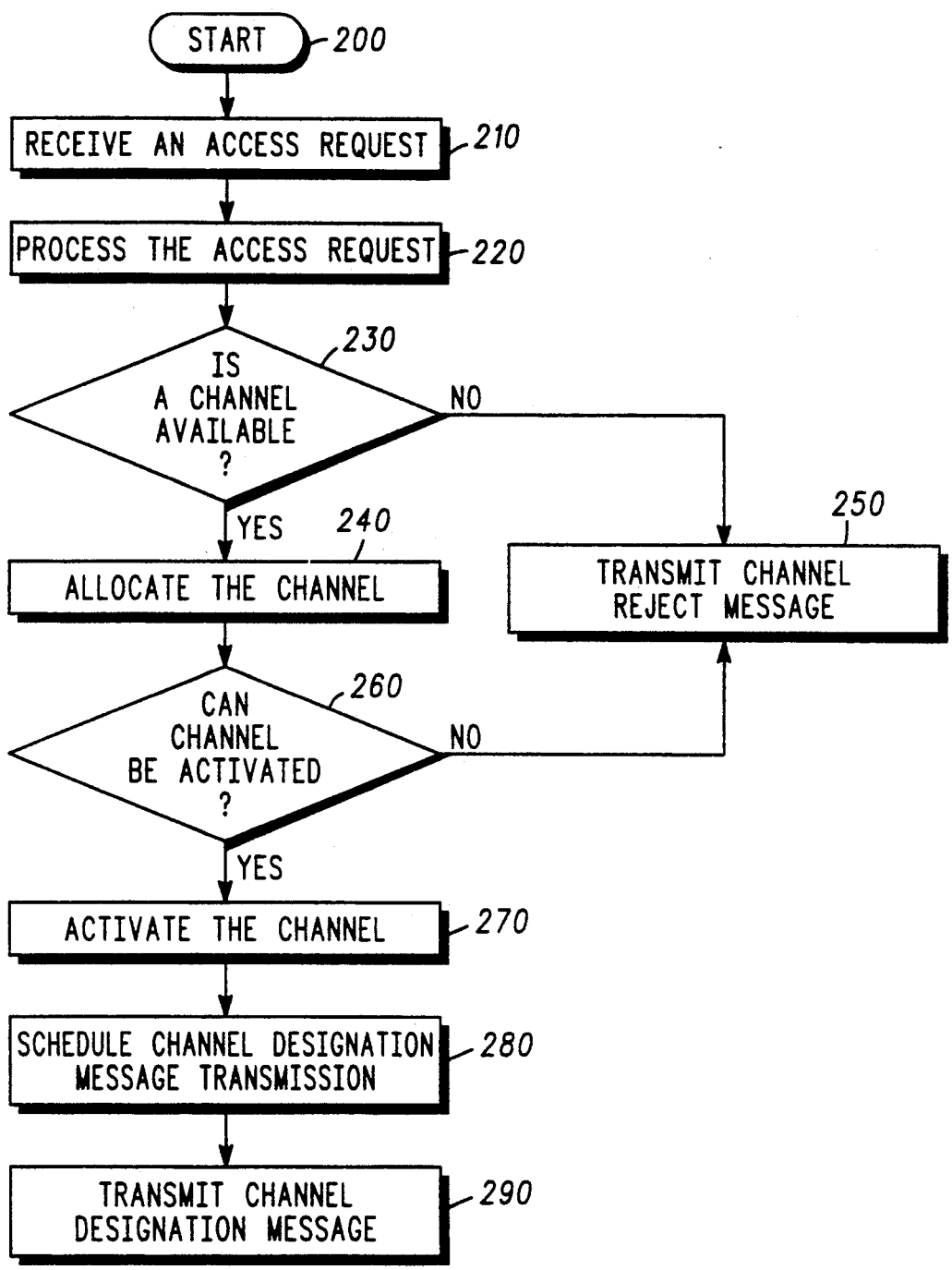
FIG. 2 is a flow chart diagram of the steps performed by a mobile unit of FIG. 1, during a call origination procedure.

Referring to FIG. 2, a flow chart of a call origination procedure is shown. The flow chart in FIG. 2 is entered at start block 200 whenever an access request is transmitted by one of the plurality of mobile units seeking a communication channel. At block 210 the access request is received by a BSS transceiver 520. Next at block 220 the access request is processed by the CPU in order to permit the BSS to identify the requested operation. This information is contained within the predefined message structure of the access request. According to the present invention, each access request is transmitted over the RACH, a multi-slot TDMA access channel. In the up link direction (mobile-to-BSS), RACH slots support the following access functions: call origination, location reporting, registration and page response. Allocating specific slots to individual functions by imposing an ordering of the slots will reduce the utilization of the RACH.

Proceeding to decision block 230, after call origination has been identified, a check is made by the CPU 530 to see if there is an available communication channel which may be allocated to the requesting mobile unit. If not, NO branch is taken to block 250 where a reject message is transmitted, by the transceiver 520 directing the mobile to take alternative actions. Otherwise, YES branch is taken to block 240, where an available communication channel is allocated for the mobile unit. Next, at decision block 260 a check is made by CPU 530 to see whether the allocated communication channel can be activated. If not, NO branch is taken back to block 250 where once again, a reject message is transmitted, by the transceiver 520 directing the mobile to take alternative actions. Otherwise, YES branch is taken to block to 270, where the allocated communication channel is activated.

Proceeding to block 280, the BSS next schedules the time when a channel designation message is to be transmitted to the requesting mobile. Finally, at block 290, a channel designation message corresponding to the received access request is transmitted to the mobile unit, informing the mobile unit which frequency and time slot to tune to in order to begin communication.

Since the BSS receives no information regarding the number of attempted requests, it has no means of distinguishing a mobile unit's first access request from those transmitted after expiration of the access timer. While this is not disruptive to overall system performance, there are decided advantages to be realized by providing the BSS with a mobile's access request count. Access request count represents information which is useful for monitoring system performance. In addition, access request count can provide assistance during the dynamic allocation of shared resources. Finally, however, access request count provides crucial information in the struggle to reduce levels of contention; especially during periods of heavy loading when the probability of contending mobiles is at its highest.

It will be appreciated by those skilled in the art that contention pertains to the situation when two or more mobile units request the same system resource at the same time. Since the BSS is incapable of responding to simultaneous access requests, contention will occur, and neither mobile will receive confirmation. At the expiration of their respective access timers, both mobiles will retransmit their respective access requests. In order to assure the access times are not identical, the BSS establishes a range of times for the mobile units serviced by the communication system. This broadcast parameter is transmitted to each mobile unit via a Broadcast Control Channel (BCCH), along with additional parameters which control, for example, the maximum number of times an access request may be transmitted. When formulating an access request, each mobile unit will randomly select a time from within the range as its access time. Random selection of the access time is one means of reducing the likelihood of contending mobiles.

Figure 3:
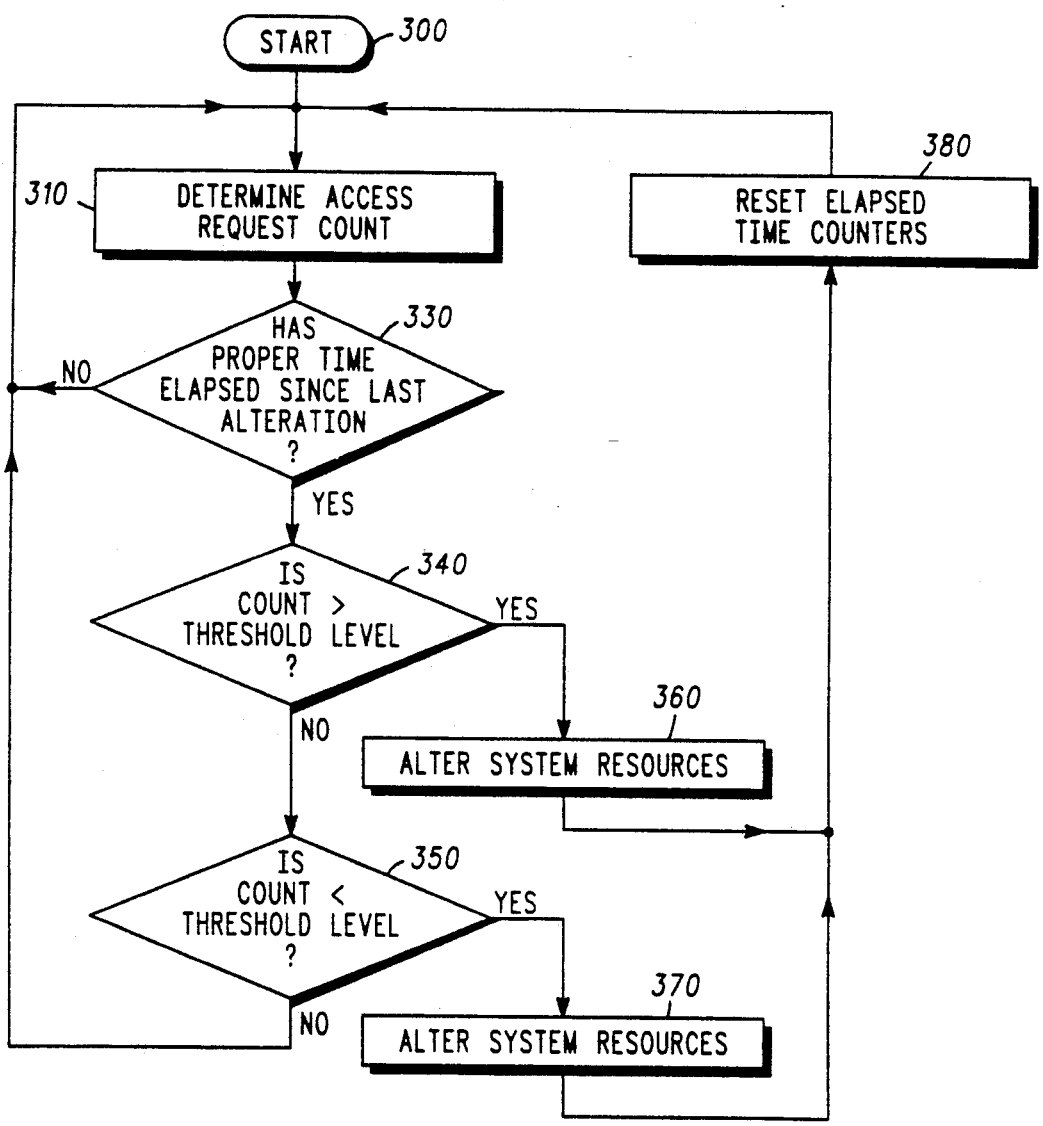
FIG. 3 is a flow chart diagram of the steps performed by a BSS of FIG. 1 in order to reduce the likelihood of contention between requesting mobile units.

Whenever it is desired to further reduce the likelihood of contention, the flow chart in FIG. 3 is utilized by BSS to alter system resources thereby providing additional protection. Entering the flow chart of FIG. 3 at the start block 300, the number of access requests transmitted by each mobile unit is determined at block 310 by the CPU 530. Unique to the present invention, each mobile unit tracks the number of access requests attempted and includes this information within each new request. The BSS can accurately determine the access request count for each mobile unit by simply processing the information contained within each received access request.

Proceeding to decision block 330, a check is made by the CPU 530 to see if a proper amount of time has lapsed since the last resource adjustment. The purpose of this step is to provide a moderate amount of damping in order to assure stable system operation damping periods characterized by rapid fluctuation in request traffic. If not, NO branch is taken back to block 310. Otherwise, YES branch is taken to decision block 340 where a check is made by the CPU 530 to see if the access request count exceeds a threshold level. If so, YES branch is taken to block 360 where the BSS CPU 530 alters system resources. One such alteration includes increasing the potential range of retry intervals. Increasing the range of retry intervals has the calculated effect of increasing the range of values randomly selected by mobile units as their access times. Thus, by increasing the range of access times as a function of the access request count, the present invention strives to distribute the mobiles across a wider range of access times, thereby reducing the likelihood of contention. Other system resource alterations include but are not limited to adding additional communication channels as a function of the access request count for some or all of the requesting mobile units; and denying further accesses as a function of the access request count for some or all of the requesting mobile units.

Next, at block 380, the elapsed time counter checked by decision block 330 is reset. Otherwise, NO branch is taken from block 340 to decision block 350, where a check is made by the CPU 530 to see if the access request count falls below a threshold level. If so, YES branch is taken to block 370 where the BSS CPU 530 alters system resources as a function of the access request count. This may include decreasing the range of potential access times for some or all of the requesting mobile units. While decreasing the range has the calculated effect of shortening access times, it is nonetheless desirable to permit quicker access request retransmission in light of improved system response. Other system resource alterations for step 370 may include, but are not limited to, deleting communication channels as a function of the access request count. Next, at block 380, the elapsed time counter checked by decision block 330 is reset. Otherwise, NO branch is taken back from block 350 to block 310.

An alternative method for reducing the likelihood of contention is shown in the flow chart of FIG. 4. Entering the flow chart of FIG. 4 at start block 400, the number of access requests transmitted by each mobile is determined by the CPU 530 at block 410. According to the present invention, each access request includes an access request count, the number of attempted access requests. The BSS can now accurately determine the access request count by simply processing the information found within received access requests via the CPU 530. Next, at block 420, the BSS CPU derives timing advance information from each mobile, in order to roughly determine the mobile's distance from the BSS. Timing advance is the round trip propagation time of a call travelling from the BSS to a mobile unit and back. From this information, the mobile's distance from the BSS relative to other mobiles using the same cell is estimated.

Proceeding to block 430, the BSS correlates the timing advance information with the access request count. This correlation will indicate to the BSS if there is a problem with the close in mobiles overriding access requests from mobiles at the cell's perimeter. This phenomenon, the near-far problem, does not appear as normal contention. When two mobiles of substantially similar signal strength collide, the BSS is incapable of distinguishing the two signals, therefore neither mobile receives confirmation. In the near-far case, however, the near mobile's signal is sufficiently stronger than the far mobile's signal and is therefore capable of overriding the distant mobile without the BSS recognizing this access as a collision Consequently, a channel designation message will be sent to the near mobile while the far mobile unit receives no response. According to the present invention, however, the BSS is now given a means of identifying the existence of the near-far phenomenon via the correlation of timing advance to the access request count. Such indication arises when distant mobiles consistently have higher access request counts than do near mobiles. Upon recognition of this unique type of contention, system resources are altered in block 440 by the BSS CPU in order to mitigate this otherwise hard to recognize anomaly.

As previously mentioned, one such alteration includes increasing the potential range of retry intervals. In accordance with the preferred embodiment, the range of retry intervals for the nearby mobiles is increased when it is determined that far away mobiles, as identified by timing advance information, consistently have higher access request counts than do the nearby mobiles. Increasing the range of retry intervals has the calculated effect of increasing the range of values randomly selected by the nearby mobile units as their access times. Thus, by increasing the range of access times as a function of the existence of the near-far anomaly, the present invention strives to distribute the nearby mobiles across a wider range of access times, thereby improving the likelihood of service to far away mobiles. Other communication system operating performance parameters which can be altered in order to reduce the likelihood of contention include but are not limited to adding communication channels for the far away mobiles as a function of the existence of the near-far anomaly; deleting communication channels for the nearby mobiles, decreasing the range of potential access times for some or all of the far away mobile units; and temporarily denying further accesses for nearby mobiles until the near-far anomaly improves. It will be appreciated by those skilled in the art that these efforts are all directed towards improving the likelihood of service to far away mobiles, by reducing contention between the near and far mobiles, relative to the BSS.

In summary, the present invention discloses a method and apparatus for reducing the likelihood of contention between a plurality of mobile units and a communication system servicing those mobile units by altering system resources as a function of access request count or the existence of the near-far anomaly. Although the present invention has been described with reference to a digital cellular radiotelephone communication system, it will be appreciated by those skilled in the art that the present invention applies to communication systems generally. In addition, other embodiments will become apparent to those skilled in the art. For example, a mobile unit may take totally independent action based upon its access request count in order to reduce the likelihood of contention. Such action includes but is not limited to altering mobile unit transmit signal strength levels, altering mobile unit random access intervals, selecting other access channels, or selecting other serving systems. It is therefore intended that the invention not be limited, except as indicated by the appended claims.

What is claimed is:

1. In a radio frequency communication system having a plurality of operating performance parameters, wherein a plurality of radio units request communication services from a communications controller within said system by transmitting channel assignment requests to said communications controller, a method for reducing contention between the plurality of requesting radio units comprising the steps of:
   receiving, at the communications controller, channel assignment requests from the plurality of requesting radio units;
   processing the received request to determine an access request count for each received request; and
   altering at least one of the communication system's operating performance parameters as a function of the access request count, in order to reduce the likelihood of contention between the plurality of requesting radio units.

2. The method of claim 1 wherein a channel assignment request comprises:
   requesting radio unit identification information;
   message identification information; and
   an access request count.

3. The method of claim 1 wherein the step of altering at least one of the communication system's operating performance parameters includes at least one of the steps of:
   adding communication channels for the requesting radio units when the access request count exceeds a predetermined threshold;
   increasing a range of random access intervals available for the requesting radio units when the access request count exceeds a predetermined threshold; and
   denying further accesses for requesting radio units when the access request count exceeds a predetermined threshold.

4. The method of claim 1 further comprising the steps of:
   comparing the access request count to a predetermined threshold; and
   altering at least one of the communication system's operating performance parameters as a function of the comparison.

5. The method of claim 1 wherein the step of altering at least one of the communication system's operating performance parameters further includes at least one of the steps of:
   deleting communication channels when the access request count does not exceed a predetermined threshold;
   decreasing a range of random access intervals available for the requesting radio units when the access request count does not exceed the predetermined threshold; and
   accepting further access requests from requesting radio units when the access request count does not exceed the predetermined threshold.

6. In a radio frequency communication system having a plurality of operating performance parameters, wherein a plurality of radio units request communication services from a communications controller within said system by transmitting channel assignment requests to said communications controller, a method for reducing contention between the plurality of requesting radio units comprising the steps of:
   receiving, at the communications controller channel assignment requests from the plurality of requesting radio units;
   processing the received requests to determine an access request count and timing advance information for each received access request;
   correlating the access request count to the timing advance information obtained for each received request to determine when far-away requesting radio units, relative to the communications controller, have larger access request counts than do nearby requesting units; and
   altering at least one of the communication system's operating performance parameters as a function of the correlation to reduce the likelihood of contention between the plurality of radio units requesting communication services from the communications controller.

7. The method of claim 6 wherein a channel assignment request comprises:
   requesting radio unit identification information;
   message identification information; and
   an access request count.

8. The method of claim 6 wherein the step of altering at least one of the communication system's operating performance parameters includes at least one of the steps of:
   adding communication channels for the requesting radio units when the access request count exceeds a predetermined threshold;
   deleting communication channels for at least one of the requesting radio units when the access request count does not exceed the predetermined threshold;
   decreasing a range of random access intervals for the requesting radio units when the access request count does not exceed the predetermined threshold;
   increasing a range of random access intervals for the requesting radio units when the access request count exceeds the predetermined threshold; and denying further accesses for requesting radio units when the access request count exceeds the predetermined threshold.

9. In a radio frequency communication system having a plurality of operating performance parameters, wherein a plurality of radio units request communication services from a communications controller within said system by transmitting channel assignment requests to said communications controller, said communications controller comprising:
   means for receiving channel assignment requests from the plurality of requesting radio units;
   means, coupled to the receiving means, for processing the channel assignment requests to determine an access request count for each received request; and
   means, coupled to the processing means, for altering at least one of the system operating performance parameters as a function of the access request count, to reduce the likelihood of contention between the plurality of requesting radio units.

10. The communications controller of claim 9 further comprising:
   means, coupled to the processing means, for comparing the access request count to a predetermined threshold; and
   means, coupled to the comparing means for altering at least one of the communication system's operating performance parameters as a function of the comparison.

11. The communications controller of claim 9 wherein the means for altering at least one of the communication system's operating performance parameters further comprises at least one of:
   means, coupled to the communications controller, for adding additional communication channels for use by the requesting radio units when the access request count exceeds a predetermined threshold;
   means, coupled to the communications controller, for deleting communication channels from use by the requesting radio units when the access request count does not exceed the predetermined threshold;
   means, coupled to the communications controller, for increasing a range of random access intervals for the requesting radio units when the access request count exceeds the predetermined threshold;
   means, coupled to the communications controller, for decreasing a range of random access intervals for the requesting radio units when the access request count does not exceed the predetermined threshold;
   means, coupled to the communications controller, for denying further accesses for requesting radio units when the access request count exceeds the predetermined threshold; and
   means, coupled to the communications controller, for accepting further access requests from requesting radio units when the access request count does not exceed the predetermined threshold.

12. In a radio frequency communication system having a plurality of operating performance parameters, wherein a plurality of radio units request communication services from a communications controller within said system by transmitting channel assignment requests to said communications controller, said communications controller comprising:
   means for receiving channel assignment requests from a plurality of radio units requesting a communications channel;
   means, coupled to the receiving means, for processing the channel assignment requests to determine an access request count and timing advance information for each received access request;
   means, coupled to the processing means, for correlating the timing advance information to the access request count for each received request to determine when far-away radio units, relative to the communications controller, have larger access request count that do near-by radio units; and
   means, coupled to the correlating means, for altering at least one of the system operating performance parameters as a function of near-far anomalies, in order to reduce the likelihood of contention between the plurality of requesting radio units.

* * * * *